May 1, 1956 — C. BRAMMING — 2,743,598
POSITIVE CONTROL VALVE FOR GASOLINE LANTERN
Filed May 19, 1951
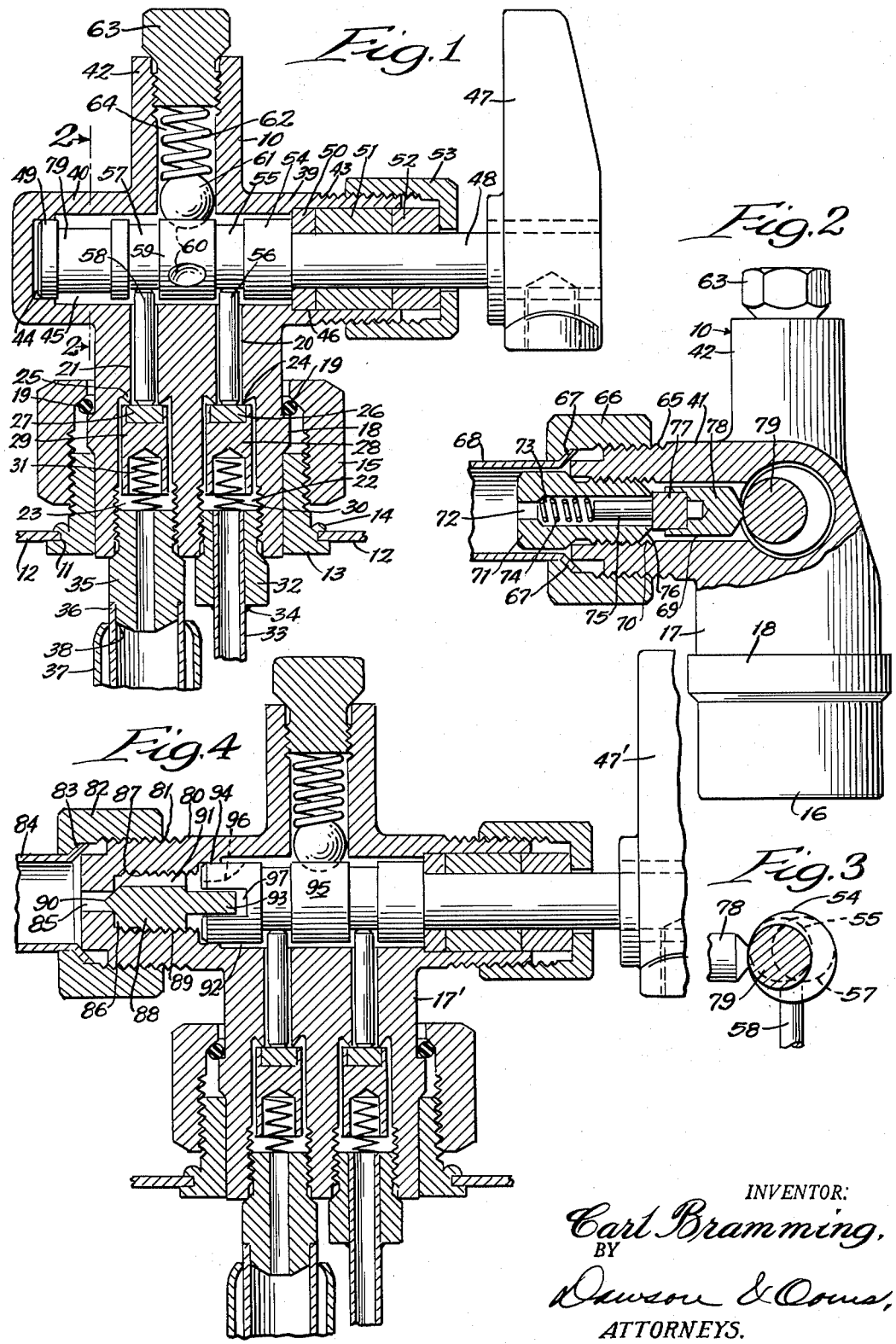
INVENTOR:
Carl Bramming,
BY Dawson & Ooms,
ATTORNEYS.

United States Patent Office 2,743,598
Patented May 1, 1956

2,743,598

POSITIVE CONTROL VALVE FOR GASOLINE LANTERN

Carl Bramming, Nashville, Tenn., assignor to Aladdin Industries, Incorporated, Nashville, Tenn., a corporation of Illinois Application May 19, 1951, Serial No. 227,179

3 Claims. (Cl. 67—41)

This invention relates to illuminating devices such as gasoline lanterns and the like in which a hydrocarbon fuel is fed under pressure to be burned in a mantle. The invention is an improvement of the fuel system of the lantern shown in my copending application Serial No. 180,062, now Patent No. 2,667,729, and relates particularly to the provision of a positive shut-off valve in the fuel system.

In the operation of the lantern shown in application Serial No. 180,062 the fuel is pressure-fed from a tank through one of two fuel feeding pipes each having a spring-loaded valve adapted to control the flow of fuel through the pipes. These valves are spring loaded to close, and are opened positively by cam follower pins actuated by circular cams. Since these valves are very small, the actuating springs which are completely contained within them are likewise small, and sometimes have been known to fail.

If one of these valve springs fails, a fuel valve will remain open, and fuel will pass into the generator tube, maintaining the light in the lantern until the pressure in the fuel tank falls to atmospheric.

In order to enable the user to extinguish the lantern at any time and to assure that the flow of fuel can be positively controlled, I have provided a positive-acting shut-off valve in the fuel system, preferably positioned between the above-mentioned valves which might fail and the generator tube of the lantern.

It is therefore an object of this invention to provide a positively controlled fuel system for a hydrocarbon fuel burner.

Another object is to provide a positive-acting valve in the fuel system of a gasoline lantern.

Another object is to provide a positively controlled shut-off valve in such a lantern adapted to assure an immediate extinguishment of the light therein under emergencies.

Further objects and advantages of my invention will be apparent from a consideration of the following specification, the appended claims and the accompanying drawings, in which, Fig. 1 is view in vertical section through the main fuel control assembly showing the operating cam shaft and two of the valves, Fig. 2 is a view partly in vertical section on the line 2—2 of Fig. 1, showing the details of the positively controlled valve, Fig. 3 is a view similar to Fig. 2, showing the valve-opening cams, and Fig. 4 is a view in vertical section, similar to Fig. 1, of an alternative construction of a positively controlled valve.

In the drawings, and referring particularly to Figs. 1, 2, and 3, there is shown the main fuel control assembly housing 10 which is mounted in an aperture 11 in the upper surface of the fuel tank 12 by means of the threaded mounting flange 13 which is attached to the tank 12 in sealed relationship as by soldering at 14. An internally threaded collar 15 engages the externally threaded mounting flange 13 to hold the housing 10 in position, the housing 10 having a lower portion 16 of its body 17 fashioned to fit snugly in the bore of the mounting flange 13, and having an annular collar 18 adapted to engage the upper edge of the flange 13 and to form a seat for the deformable sealing ring 19 which occupies the space between the collar 18 and the threaded collar 15.

The body 17 of the control housing 10 is drilled to form the passages 20 and 21, and then counterbored to form the valve chambers 22 and 23, the valve seats 24 and 25 being undercut as shown to provide conical seating faces for engagement by the valve inserts 26 and 27. The inserts 26 and 27 are carried in recesses provided in the upper ends of the valve plungers 28 and 29, and are made of a deformable material so that they will form tight seals with the valve seats 24 and 25 under the urging of the very small valve springs 30 and 31 which are carried in recesses in the lower ends of the valve plungers 28 and 29.

The valve spring 30 impinges against the upper face of the plug 32 which is held in position by its threaded engagement with the lower end of the chamber 22. The plug 32 defines a central bore which receives the fuel tube 33, held in engagement by soldering as at 34. The fuel tube 33 projects a predetermined distance into the fuel tank 12, and provides fuel for normal operation of the burner.

The valve spring 31 impinges against the upper face of the plug 35 which is held in position by its threaded engagement with the lower end of the chamber 23. The plug 35 has a central bore and carries a fuel intake pipe 36 and a jacket tube 37, attached thereto as by soldering at 38, which operate to furnish atomized fuel for starting the burner.

The body 17 of the housing 10 is formed with a plurality of bosses projecting therefrom. The horizontal bosses 39 and 40 are diametrically opposite each other. The horizontal boss 41 is in the same plane as the bosses 39 and 40 but projects perpendicularly thereto. The vertical boss 42 is in the same plane as the bosses 39 and 40 but projects perpendicularly thereto.

The boss 39 has external threads 43. The passage defined by the bosses 39 and 40 is drilled to form the bearing cup or socket 44, then counterbored to form the chamber 45, and again counterbored to form the chamber 46. The operating handle 47 is mounted on the shaft 48 which is seated with its bearing end 49 in the socket 44. The shaft 48 is fitted with a sealing gasket 50 which is backed up by a packing sleeve 51, and a pressure collar 52. The threaded cup 53 engages the end of the pressure collar 52 and mates with the threads 43, thereby providing a pressure seal for the shaft 48.

The actuating camshaft 54 is formed integral with the shaft 48 and the bearing end 49, and defines a first circular cam 55 of approximately two-thirds the diameter of the camshaft and formed to have a tangent common to that of the camshaft 54. The cam 55 is adapted to be engaged by the cam follower 56 which lies loosely in the passage 20 and engages the valve insert 26 whereby to open the valve in to the chamber 22.

The camshaft 54 also defines a second circular cam 57 which is similarly related to the camshaft 54 and positioned approximately 120° in angular distance from the cam 55, as clearly appears in Fig. 3. The cam 57 is adapted to be engaged by the cam follower 58 which lies loosely in the passage 21 and engages the valve insert 27 whereby to open the valve into the chamber 23.

In order to insure the accurate positioning of the valves by the three-position control handle 47, the central portion 59 of the camshaft 54 is formed with three detent positions 60 adapted to receive the ball 61 which is assisted by the spring 62 in the well-known manner. The plug 63 threadedly engages the bore 64 in the boss 42. With this construction it will be apparent that the control handle 47 will remain in only one of three predetermined index positions, denominated respectively as "off," "start" and "run."

Turning now more particularly to Fig. 2, the boss 41 is provided with external threads 65 to mate with the threaded cap 66 which holds the flared end 67 of the generator tube 68 in sealed engagement with the end of the boss 41. The boss 41 defines a bore 69 having threads 70 adapted to mate with the threaded plug 71. The plug 71 is formed with a passage 72 and is counterbored to form a chamber 73 within which is positioned a spring 74 which impinges against a shoulder at the end of the chamber 73 and against the valve plunger 75 which is loosely mounted therein. The inner end 76 of the plug 71 is of conical formation to provide a good valve seat for the insert 77 which is also formed of a deformable material and is carried by the cam follower 78, in turn loosely positioned in the chamber 69.

Returning to the camshaft 54, there is provided a third circular cam 79 which is related to the camshaft as are the cams 55 and 57, but which is preferably positioned about 30° in angular distance from the cam 55 and in a direction away from the cam 57, or 30° in angular distance from the cam 57 and in a direction away from the cam 55 as clearly appears in Fig. 3. When the cam 79 is rotated to its "off" position, the cam follower 78 and the insert 77 are forced against the action of the spring 74 and positively close the valve formed at 76, whereas when the cam 79 is rotated into either of the other two positions, the valve is opened by the spring 74 and a clear fuel passage is made available.

In operation, and with fuel under pressure in the tank 12, the control handle is rotated from the "off" position shown in Figs. 1 and 2 through an angular distance of approximately 120° so that the cam 57 moves the cam follower 58, thereby opening the valve into the chamber 23. This rotation will also allow the spring 74 to open the valve at 76. Atomized fuel can then move from the tank 12 through fuel pipe 36, the chamber 23, past the cam follower 58, around the camshaft 54, past the cam follower 78, through the chamber 73 and into the generator tube 68, whence it will be conducted to the mantle and may be ignited.

After the generator tube has become heated it is no longer necessary to use atomized fuel from the tank 12, and the control handle 47 may be rotated to the next position. This movement will rotate the cam 57 so as to allow the valve in the chamber 23 to be closed by the action of the spring 31, and will at the same time cause the cam 55, operating through the cam follower 56, to open the valve in the chamber 22, thereby allowing liquid fuel to move through the fuel intake pipe 33, the chamber 22, the passage 20, past the camshaft 54, and into the generator tube 68 via the passage 72.

When it is desired to extinguish the light in the lantern, the control handle is returned to the "off" position which returns the cams 55 and 57 to the position shown in Fig. 1, allowing the spring 30 to close its valve. It also rotates the cam 79 into the position shown in Figs. 2 and 3, thereby positively closing the valve at 76 against the action of the spring 74.

An alternative construction of a positively actuated valve in the fuel system of a gasoline lantern is shown in Fig. 4. Many of the parts thereof are the same as those heretofore described and need not be redescribed.

In the alternative construction the body 17 is formed with a boss 80 having external threads 81 adapted to be engaged with the internally threaded cap 82 which holds the flared end 83 of the generator tube 84 in sealed engaged by the internally threaded cap 82 which holds The boss 80 is drilled to provide a fuel passage 85, and is counterbored to provide a tubular valve chamber 86 having its inner wall threaded in a steep pitch thread 87.

A valve member 88 is formed with matching threads 89 and a conical nose portion 90 adapted to engage the shoulder formed at the inner end of the passage 85 in sealing relationship. The valve member 88 is provided with a plurality of flutes or channels 91 which operate as fuel passages between the chamber 92 and the passage 85, and is also formed with a flattened inner end 93 designed for a purpose to be described hereinafter.

The boss 80 is counterbored to form the bearing 94 adapted to be engaged by the end of the camshaft 95, and again counterbored to form the chamber 92 which is otherwise similar to the chamber 45 shown in Fig. 1, and of a size sufficient to provide fuel passages around the camshaft 95. A slot 96 is formed in the camshaft 95 to provide a fuel passage past the bearing 94, and the end of the camshaft 95 is formed with a transverse slot 97 to provide a forked engagement with the flattened end 93 of the valve member 88.

In operation the actuating handle 47 is rotated approximately 120° and 240°, similarly to the operation of the embodiment of the invention shown in Figs. 1 and 2 hereof. When the handle 47 is so rotated, the valve member 88, by reason of its engagement with the forked end of the camshaft 95, is rotated away from the valve seat, thereby opening a fuel passage into the generator tube 84. Conversely, when the operating handle is rotated to the "off" position, the valve member 88 will be screwed down into engagement with the valve seat.

Having described my invention, what I desire to claim and protect by Letters Patent is:

1. A starting valve mechanism for selectively controlling the flow of atomized fuel and liquid fuel from a tank to a vapor type burner, said valve mechanism comprising an outlet conduit for carrying fuel to the burner, a first inlet conduit for conveying atomized fuel from the tank, a second inlet conduit for conveying liquid fuel from the tank, first and second inlet valves connected between said outlet conduit and said respective inlet conduits, each of said inlet valves having a valving member movable between open and closed positions and a spring biasing said member toward said closed position, an outlet valve connected in said outlet line, said outlet valve having a valving element movable between open and closed positions and a spring biasing said valving element toward said closed position, an actuator shaft rotatable into first, second, and third positions, detent means for releasably holding said shaft in said positions, an outlet valve cam and first and second inlet valve cams on said shaft, first and second cam followers operable by said first and second inlet valve cams for positively opening said first and second inlet valving members, and a third cam follower operable by said outlet valve cam for positively closing said outlet valving element, said first inlet valve cam and said first cam follower being constructed and arranged for positively opening said first inlet valve member in said first position of said shaft while permitting closure of said first inlet valve in said second and third positions of said shaft, said second inlet valve cam and said second follower being constructed and arranged for positively opening said second inlet valve in said second position of said shaft while permitting closure of said second inlet valve in said first and third positions of said shaft, said outlet valve cam and said third follower being constructed and arranged for positively closing said outlet valving element in said third position of said shaft while permitting opening of said valving element in said first and second positions of said shaft.

2. A starting valve mechanism for selectively controlling the flow of atomized fuel and liquid fuel from a tank to a vapor type burner, said valve mechanism comprising an outlet conduit for carrying fuel to the burner, a first inlet conduit for conveying atomized fuel from the tank, a second inlet conduit for conveying liquid fuel from the tank, first and second inlet valves connected between said outlet conduit and said respective inlet conduits, each of said inlet valves having a valving member movable between open and closed positions and a spring biasing said member toward said closed position, an outlet valve connected in said outlet line, said outlet valve having a valving element movable between open and closed positions and a spring biasing said valving element toward said closed position, an actuator shaft rotatable into first, second, and third positions, an outlet valve cam and first and second inlet valve cams on said shaft, first and second cam followers operable by said first and second inlet valve cams for positively opening said first and second inlet valving members, and a third cam follower operable by said outlet valve cam for positively closing said outlet valving element, said first inlet valve cam and said first cam follower being constructed and arranged for positively opening said first inlet valve member in said first position of said shaft while permitting closure of said first inlet valve in said second and third positions of said shaft, said second inlet valve cam and said second follower being constructed and arranged for positively opening said second inlet valve in said second position of said shaft while permitting closure of said second inlet valve in said first and third positions of said shaft, said outlet valve cam and said third follower being constructed and arranged for positively closing said outlet valving element in said third position of said shaft while permitting opening of said valving element in said first and second positions of said shaft.

3. A starting valve mechanism for selectively controlling the flow of atomized fuel and liquid fuel from a tank to a vapor type burner, said valve mechanism comprising an outlet conduit for carrying fuel to the burner, a first inlet conduit for conveying atomized fuel from the tank, a second inlet conduit for conveying liquid fuel from the tank, first and second inlet valves connected between said outlet conduit and said respective inlet conduits, each of said inlet valves having a valving member movable between open and closed positions and a spring biasing said member toward said closed position, an outlet valve connected in said outlet line, said outlet valve having a valving element movable between open and closed positions, an actuator shaft rotatable into first, second, and third positions, detent means for releasably holding said shaft in said positions, first and second inlet valve cams on said shaft, first and second cam followers operable by said first and second inlet valve cams for positively opening said first and second inlet valving members, and means operable by said shaft for positively closing said outlet valving element, said first inlet valve cam and said first cam follower being constructed and arranged for positively opening said first inlet valve member in said first position of said shaft while permitting closure of said first inlet valve in said second and third positions of said shaft, said second inlet valve cam and said second follower being constructed and arranged for positively opening said second inlet valve in said second position of said shaft while permitting closure of said second inlet valve in said first and third positions of said shaft, said means being constructed and arranged for positively closing said outlet valving element in said third position of said shaft while opening said valving element in said first and second positions of said shaft.

References Cited in the file of this patent

UNITED STATES PATENTS

| | | |
|---|---|---|
| 1,120,184 | Duff | Dec. 8, 1914 |
| 1,822,346 | Guiles | Sept. 8, 1931 |
| 2,299,719 | Frimel | Oct. 20, 1942 |
| 2,516,269 | Starkey | July 25, 1950 |
| 2,592,353 | Stevenson | Apr. 8, 1952 |
| 2,664,729 | Bramming | Jan. 5, 1954 |